(12) United States Patent
Gassner

(10) Patent No.: US 9,773,430 B2
(45) Date of Patent: Sep. 26, 2017

(54) MEDICAL HAND CONTROLLER FOR DISABILITIES

(71) Applicant: LIMOSS (SHENZHEN) CO., LTD, Shenzhen, Guangdong (CN)

(72) Inventor: Christian Gassner, Guangdong (CN)

(73) Assignee: LIMOSS (SHENZHEN) CO., LTD, Shenzhen (CN)

( * ) Notice: Subject to any disclaimer, the term of this patent is extended or adjusted under 35 U.S.C. 154(b) by 0 days.

(21) Appl. No.: 15/008,468

(22) Filed: Jan. 28, 2016

(65) Prior Publication Data

US 2017/0110004 A1    Apr. 20, 2017

(30) Foreign Application Priority Data

Oct. 19, 2015  (CN) .................... 2015 2 0806348 U

(51) Int. Cl.
*G09B 21/00*   (2006.01)
*G08C 17/02*   (2006.01)

(52) U.S. Cl.
CPC .......... *G09B 21/007* (2013.01); *G08C 17/02* (2013.01); *G09B 21/001* (2013.01); *G09B 21/006* (2013.01); *G08C 2201/30* (2013.01)

(58) Field of Classification Search
CPC .... G09B 21/00; G09B 21/001; G09B 21/003; G09B 21/006; G09B 21/007
See application file for complete search history.

(56) References Cited

U.S. PATENT DOCUMENTS

| | | | | |
|---|---|---|---|---|
| 5,284,444 A | * | 2/1994 | Raynes | G09B 21/007 116/DIG. 17 |
| 5,690,277 A | * | 11/1997 | Flood | G05D 23/1902 116/205 |
| 5,873,178 A | * | 2/1999 | Johnson | F26B 9/003 34/90 |
| 7,400,716 B1 | * | 7/2008 | Gibson, Sr. | H04M 1/0291 379/167.01 |
| 8,188,851 B2 | * | 5/2012 | Haartsen | G06F 1/3215 340/3.1 |
| 2003/0071859 A1 | * | 4/2003 | Takami | G06F 3/016 715/865 |
| 2007/0035523 A1 | * | 2/2007 | Cohen | G06F 9/4443 345/169 |
| 2007/0205993 A1 | * | 9/2007 | Gloyd | G06F 3/0219 345/169 |

(Continued)

*Primary Examiner* — Thomas Alunkal

(57) ABSTRACT

The present invention provides a medical hand controller for disabilities, including a hand controller body; a control button, arranged on the body and applied to control a motor terminal; a voice broadcast device installed inside the hand controller body and applied to voice broadcast a function of the button when the control button is pressed and lasted for an overlong period exceeding a preset value, wherein, the voice broadcast device connects to the control button electrically; and an emboss, set on the control button, applied to mark the function. When a blind or a user with poor eyesight is operating the hand controller, if a control button is pressed, the function of the button will be voice broadcasted, also, the function could be identified through touching the embosses set on the control button, which has facilitated the usage of any users with abnormal eyesight.

8 Claims, 5 Drawing Sheets

(56) References Cited

U.S. PATENT DOCUMENTS

| | | | |
|---|---|---|---|
| 2010/0195295 A1* | 8/2010 | Wilkolaski | A61G 12/00 361/752 |
| 2011/0020771 A1* | 1/2011 | Rea | G09B 21/02 434/114 |
| 2012/0146890 A1* | 6/2012 | Karstens | G06F 3/016 345/156 |
| 2013/0245545 A1* | 9/2013 | Arnold | A61M 5/1723 604/66 |
| 2016/0284235 A1* | 9/2016 | Zhang | G09B 21/003 |

* cited by examiner

MEDICAL HAND CONTROLLER FOR DISABILITIES

CROSS-REFERENCES TO RELATED APPLICATIONS

This application claims the priority of Chinese patent application no. 201520806348X, filed on Oct. 19, 2015, the entire contents of all of which are incorporated herein by reference.

FIELD OF THE INVENTION

The present invention relates to the field of technologies on remote control devices, and more particularly, to a medical hand controller for disabilities.

BACKGROUND

Currently, hand controllers applied to control motor terminals, are all designed for a normal person to operate. However, when a blind or a person with poor eyesight wants to operate such a hand controller, it is hard for him to identify the specific function of each button on the hand controller, which means, it is impossible for him to control the motor terminals through current hand controllers.

Therefore, the prior art needs to be improved and developed.

BRIEF SUMMARY OF THE DISCLOSURE

The technical problem to be solved in the present invention, aiming at the defects of the prior art, provides a new medical hand controller for disabilities, in order to solve the problems in the prior art that, all current hand controllers are designed for normal people to operate only, and when a blind or a person with poor eyesight wants to operate a hand controller, there is no mechanism to remind him what the function of the pressed button is.

In order to achieve the above said targets, the technical solution of the present invention is as follows:

A medical hand controller for disabilities includes:
a hand controller body;
a control button, arranged on the hand controller body and used to control a motor terminal;
a voice broadcast device, installed inside the hand controller body and applied to voice broadcast a function of the button when a control button is pressed and lasted for an overlong period exceeding a preset value, the voice broadcast device connects to the control button electronically; and
an emboss, set on the control button, applied to mark the function of the button.

In an embodiment of the present application, a magnetic inducted wake-up device is set in the hand controller body, to wake the hand controller up.

In an embodiment of the present application, at least one control button is arranged on a front surface of the hand controller body and at least one control button is arranged on a left or right side of the hand controller body.

In an embodiment of the present application, a removable protective edge is engaged in the hand controller body, to cover the control button on the left or right side of the hand controller body, in order to prevent users from accidentally touching.

In an embodiment of the present application, a 360 degrees rotatable hanger is arranged in the protective edge.

In an embodiment of the present application, a cross section of the control button is of a circular, oval, semi-circular, crescent or polygonal shape.

The medical hand controller for disabilities, wherein, a model of the voice broadcast device is AP23085.

Benefits: a medical hand controller for disabilities as described in the present embodiments, includes a hand controller body; a control button arranged on the body and applied to control a motor terminal; a voice broadcast device installed in the hand controller body and applied to voice broadcast a function of the button when a control button is pressed and lasted for an overlong period exceeding a preset value, wherein, the voice broadcast device connects to the control button electrically; and some embosses, set on the control button, to mark the function. When a blind or a user with poor eyesight is operating the hand controller, if a control button is pressed, the function of the button will be voice broadcasted, also, it is possible to identify the function of a button through touching the emboss set on the control button, which has facilitated the usage of any users with abnormal eyesight.

DETAILED DESCRIPTION

The present invention provides a medical hand controller for disabilities, in order to make the purpose, technical solution and the advantages of the present invention clearer and more explicit, further detailed descriptions of the present invention are stated here, referencing to the attached drawings and some embodiments of the present invention. It should be understood that the detailed embodiments of the invention described here are used to explain the present invention only, instead of limiting the present invention.

Figure 1:
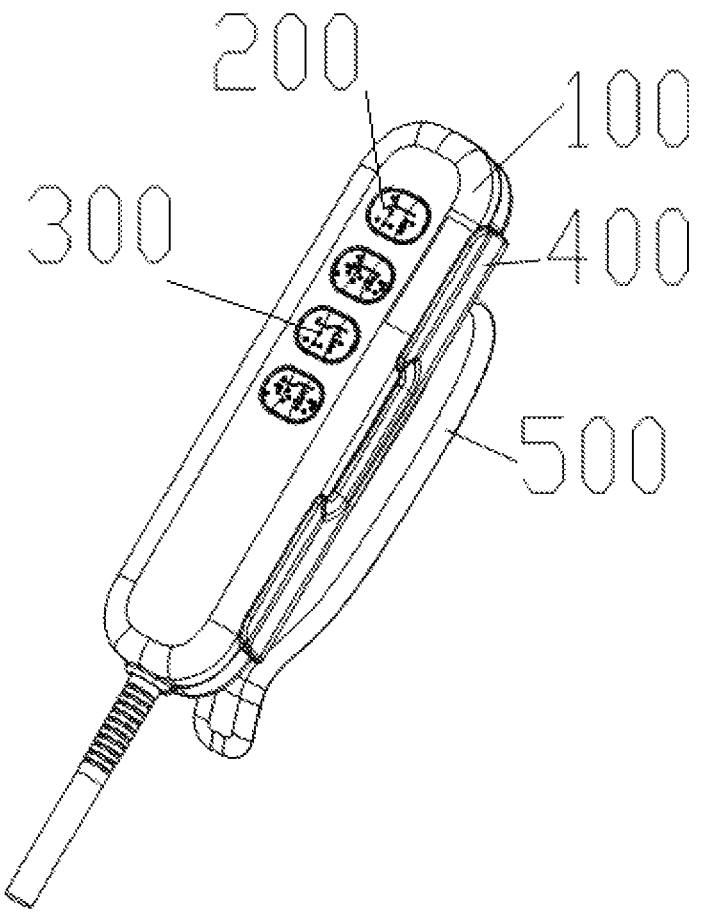
FIG. 1 illustrates a schematic diagram on a first use state of a medical hand controller for disabilities as provided in the present invention.
Figure 2:
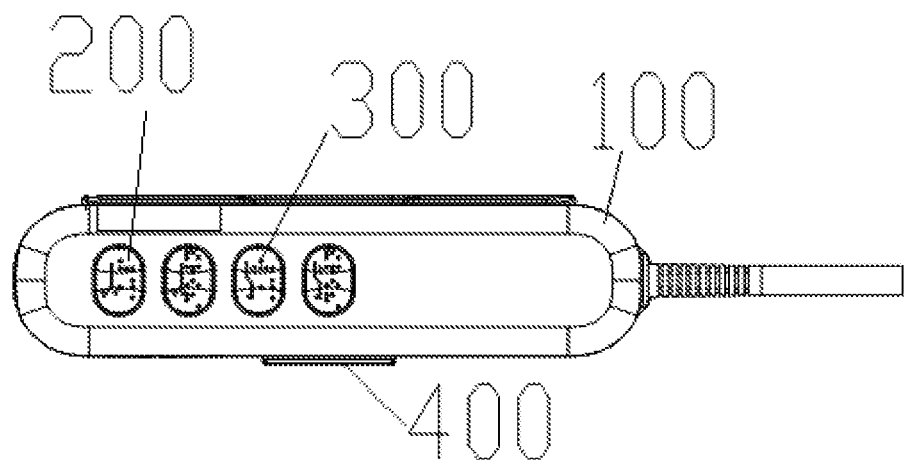
FIG. 2 illustrates a front view on the first use state of the medical hand controller for disabilities as provided in the present invention.
Figure 3:
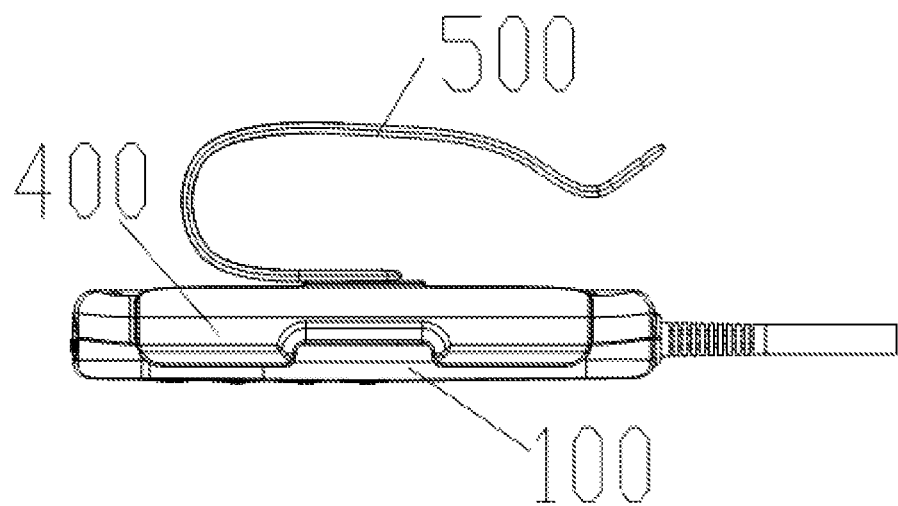
FIG. 3 illustrates a top view on the first use state of the medical hand controller for disabilities as provided in the present invention.
Figure 4:
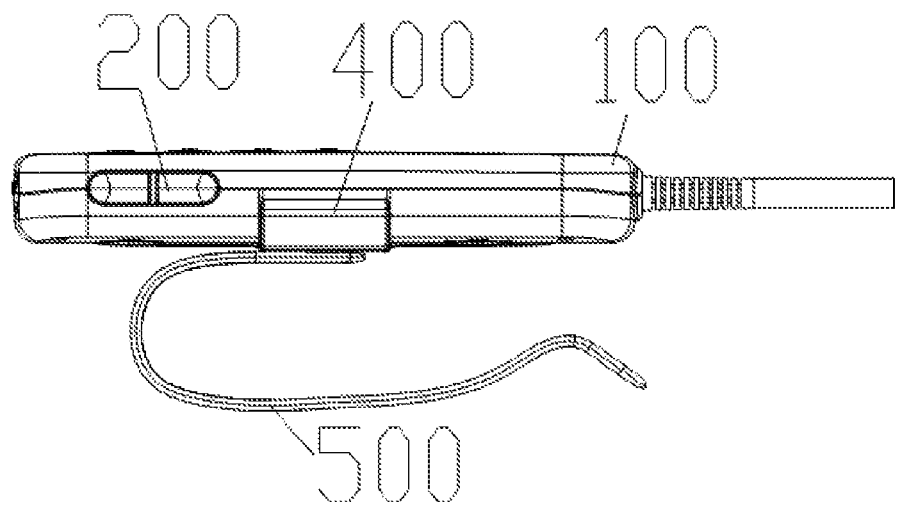
FIG. 4 illustrates a bottom view on the first use state of the medical hand controller for disabilities as provided in the present invention.
Figure 8:
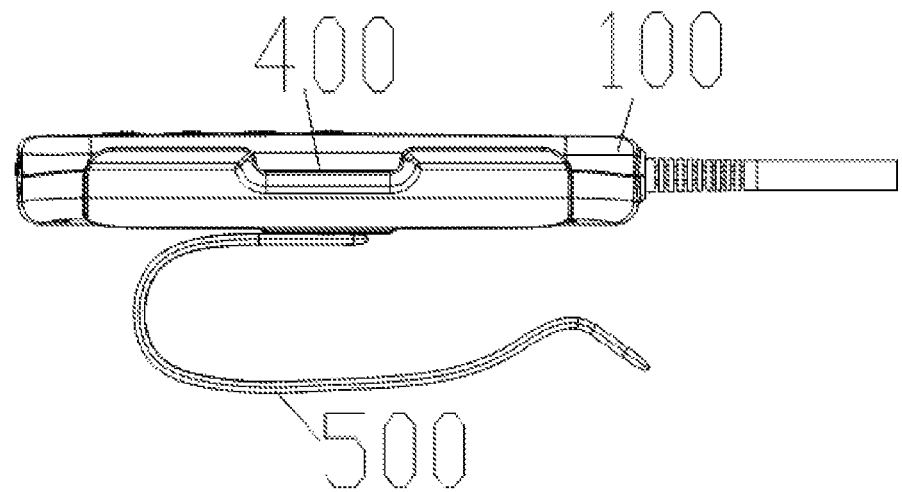
FIG. 8 illustrates a bottom view on the second use state of the medical hand controller for disabilities as provided in the present invention.

Referring to figures from FIG. 1 up to FIG. 8 together, The medical hand controller for disabilities, includes: a hand controller body 100; a control button 200, arranged on the hand controller body 100, and applied to control a motor terminal; a voice broadcast device, (which is not marked in the FIGs) installed inside the hand controller body and applied to voice broadcast a function of the button when a control button is pressed and lasted for an overlong period exceeding a preset value, the voice broadcast device connects to the control button 200 electronically; and some embosses 300, arranged on the control button 200, to mark the function of the control button. Due to the arrangement of the emboss 300 on the control button 200, which is applied to mark the function of the control button (in specific implementations, the emboss 300 is braille dots), besides, the voice broadcast device is installed inside the hand controller body 100 and applied to voice broadcast the function of the button when the control button 200 is pressed and lasted for an overlong period exceeding a preset value, thus, when the blind or a user with poor eyesight presses the control button 200, it will broadcast the function of the specific control button 200 in voice. For example, if the control button 200 is applied to control turning on or off the motor terminal, then it will be broadcasted as a switch button; if the control button 200 is applied to control speeding up the rotation of the motor terminal, then it will be broadcasted as a speed-up button; and if the control button 200 is applied to control speeding down the rotation of the motor terminal, then it will be broadcasted as a speed-down button. In such a way, the application for the blind or the user with poor eyesight is doubly secured by setting both the emboss 300 and the voice broadcast device.

In preferred embodiments, a model of the voice broadcast device is AP23085. Further, a magnetic inducted wake-up device is arranged in the hand controller body 100 (which is not marked in the FIGs, it is arranged in a PCB board inside the hand controller body), to wake up the hand controller. In such a way, if the hand controller is on the dormant state due to long time not in use (such as 1-5 minutes), when a user needs to wake it up for operations, he only needs to apply a magnet to touch a specific area in the hand controller body 100, the hand controller will be waken up.

In preferred embodiments, a front surface of the hand controller body 100 is arranged with at least one control button 200, a left side and/or the right side of the hand controller body 100 is arranged with at least one control button 200. Wherein, in specific implementations, the control button 200 may include at least one switch button, one speed-up button and one speed-down button, also, the braille dots representing switch is arranged on the switch button, the braille dots representing speeding up is arranged on the speed-up button, and the braille dots representing speeding down is arranged on the speed-down button.

In order to facilitate user's operations, the control button 200 arranged on the front surface of the hand controller body 100 is the same as the one arranged on the left side or right side of the hand controller body 100. For example, the switch button, the speed-up button and the speed-down button are set on the front surface of the hand controller body 100, then the body also has the switch button, the speed-up button and the speed-down button set on the left side or right side of the hand controller body 100, in such a way, a user with one disabled hand can also operate the hand controller with the healthy hand conveniently.

Figure 5:
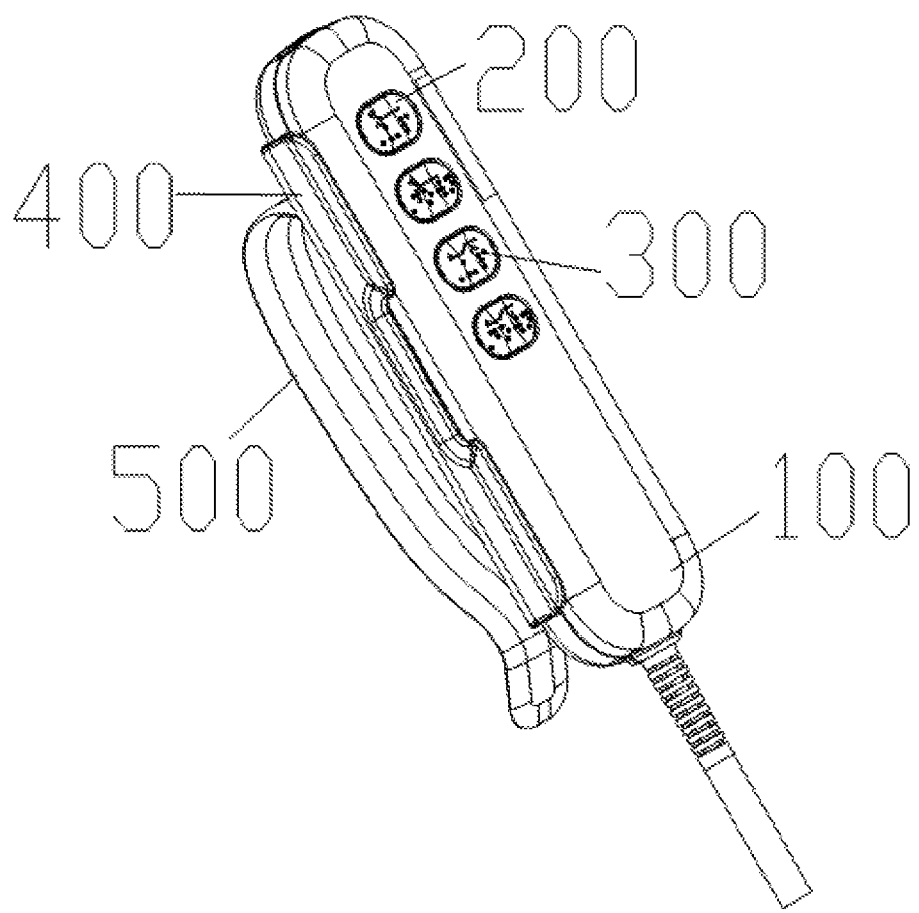
FIG. 5 illustrates a schematic diagram on a second use state of the medical hand controller for disabilities as provided in the present invention.
Figure 6:
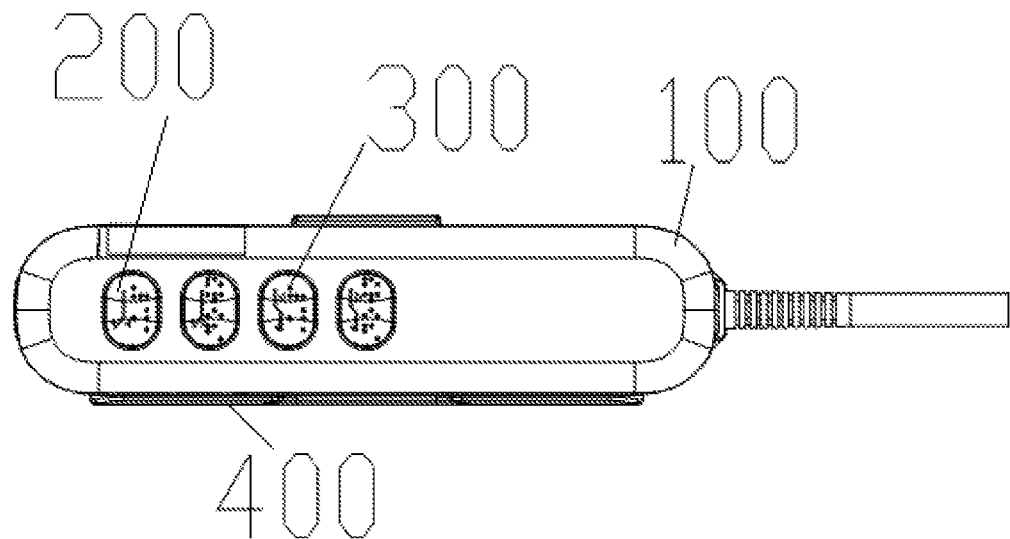
FIG. 6 illustrates a front view on the second use state of the medical hand controller for disabilities as provided in the present invention.
Figure 7:
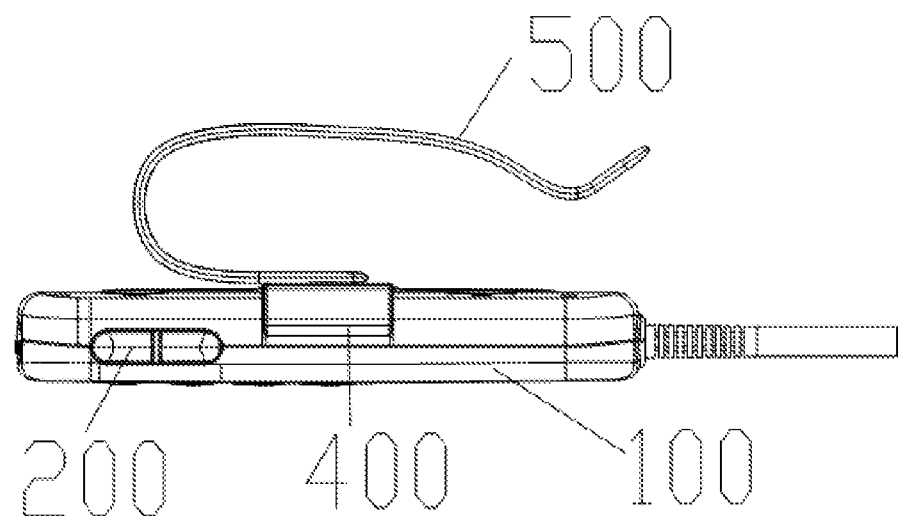
FIG. 7 illustrates a top view on the second use state of the medical hand controller for disabilities as provided in the present invention.

Furthermore, as shown in FIG. 1 and FIG. 5, a removable protective edge 400 is engaged in the hand controller body 100, to cover the control button on the left or right side of the hand controller body 100, in order to prevent a user from touching it by mistake, wherein, the schematic diagram on the protective edge 400 covering the control button on the right side are shown in FIG. 1, and the schematic diagram on the protective edge 400 covering the control button on the left side are shown in FIG. 5. In such a way, the control button on the side that the user is inconvenient to operate is covered by the protective edge 400, and the user's touching by mistake is prevented.

Figure 9:
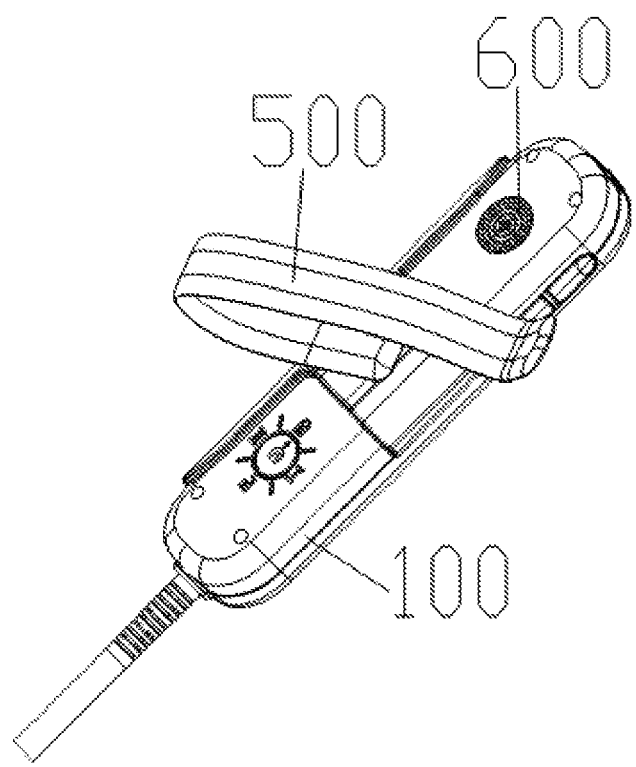
FIG. 9 illustrates a schematic diagram on a rotated hanger in the medical hand controller for disabilities as provided in the present invention.

Furthermore, as shown in FIG. 9, a 360 degrees rotatable hanger 500 is arranged in the protective edge 400. In such a way, when the user re-engaging the protective edge 400 inversely into the hand controller body 100, after the protective edge 400 is detached and rotated for 180 degrees, the hanger 500 will also rotate for 180 degrees and return to the original status of pointing to the lower end of the hand controller, which is convenient to hang the hand controller into a fixed hook. In specific implementations, as shown in FIG. 9, a bell mouth 600 is arranged in the hand controller body 100 and facing to the voice broadcast device.

Furthermore, as shown in FIG. 1 and FIG. 5, the control button 200 may also be designed into different shapes. Specifically, a cross section of the control button 200 is of a circular, oval, semi-circular, crescent or polygonal shape, which helps to improve the appearance beauty of the products.

In summary, the medical hand controller for disabilities, as provided by the present invention, including a hand controller body; a control button arranged on the body and applied to control a motor terminal; a voice broadcast device installed in the hand controller body and applied to voice broadcast a function of the button when a control button is pressed and lasted for an overlong period exceeding a preset value, wherein, the voice broadcast device connects to the control button electrically; and an emboss, set on the control button, applied to mark the function. When a blinder or a user with poor eyesight is operating the hand controller, if a control button is pressed, the function of the button will be voice broadcasted, also, it is possible to identify the function of the button through touching the emboss set on the control button, which has facilitated the usage of those users with abnormal eyesight.

It should be understood that, the application of the present invention is not limited to the above examples listed. It will be possible for a person skilled in the art to make modification or replacements according to the above descriptions, which shall all fall within the scope of protection in the appended claims of the present application.

What is claimed is:

1. A medical hand controller for disabilities, comprising:
   a hand controller body;
   plurality of control buttons, arranged on the hand controller body and used to control a motor terminal;
   a voice broadcast device, installed inside the hand controller body and applied to voice broadcast a function of each control button when each control button is pressed and lasted for an overlong period exceeding a preset value, the voice broadcast device connects to each control button; and
   an emboss, set on each control button and applied to mark the function of each control button;
   wherein the plurality of control buttons comprise at least one switch button turning on or off the motor terminal, at least one speed-up button speeding up rotation of the motor terminal and at least one speed-down button speeding down the rotation of the motor terminal.

2. The medical hand controller for disabilities according to claim 1, wherein, a magnetic inducted wake-up device is set in the hand controller body applied to wake the hand controller up.

3. The medical hand controller for disabilities according to claim 1, wherein, the plurality of control buttons are arranged on a surface of the hand controller body and a left or right side of the hand controller body; the plurality of control buttons arranged on the surface of the hand controller body are the same as the plurality of control buttons arranged on the left or right side of the hand controller body.

4. The medical hand controller for disabilities according to claim 3, wherein, a removable protective edge is engaged in the hand controller body, applied to cover the plurality of control buttons on the left or right side of the hand controller body, in order to prevent users from accidentally touching.

5. The medical hand controller for disabilities according to claim 4, wherein, a 360 degrees rotatable hanger is arranged in the protective edge.

6. The medical hand controller for disabilities according to claim 1, wherein, a cross section of each control button is of a circular, oval, semi-circular, crescent or polygonal shape.

7. The medical hand controller for disabilities according to claim 1, wherein, a model of the voice broadcast device is AP23085.

8. The medical hand controller for disabilities according to claim 1, wherein, the plurality of control buttons are arranged on a surface of the hand controller body, a left side of the hand controller body, and a right side of the hand controller body; the plurality of control buttons arranged on the surface of the hand controller body, the left side of the hand controller body, and the right side of the hand controller body comprise one switch button turning on or off the motor terminal, one speed-up button speeding up rotation of the motor terminal and one speed-down button speeding down the rotation of the motor terminal.

* * * * *